G. ZINT.
AUTOMATIC SPRINKLER.
APPLICATION FILED AUG. 13, 1914.
1,146,228.
Patented July 13, 1915.
3 SHEETS—SHEET 1.
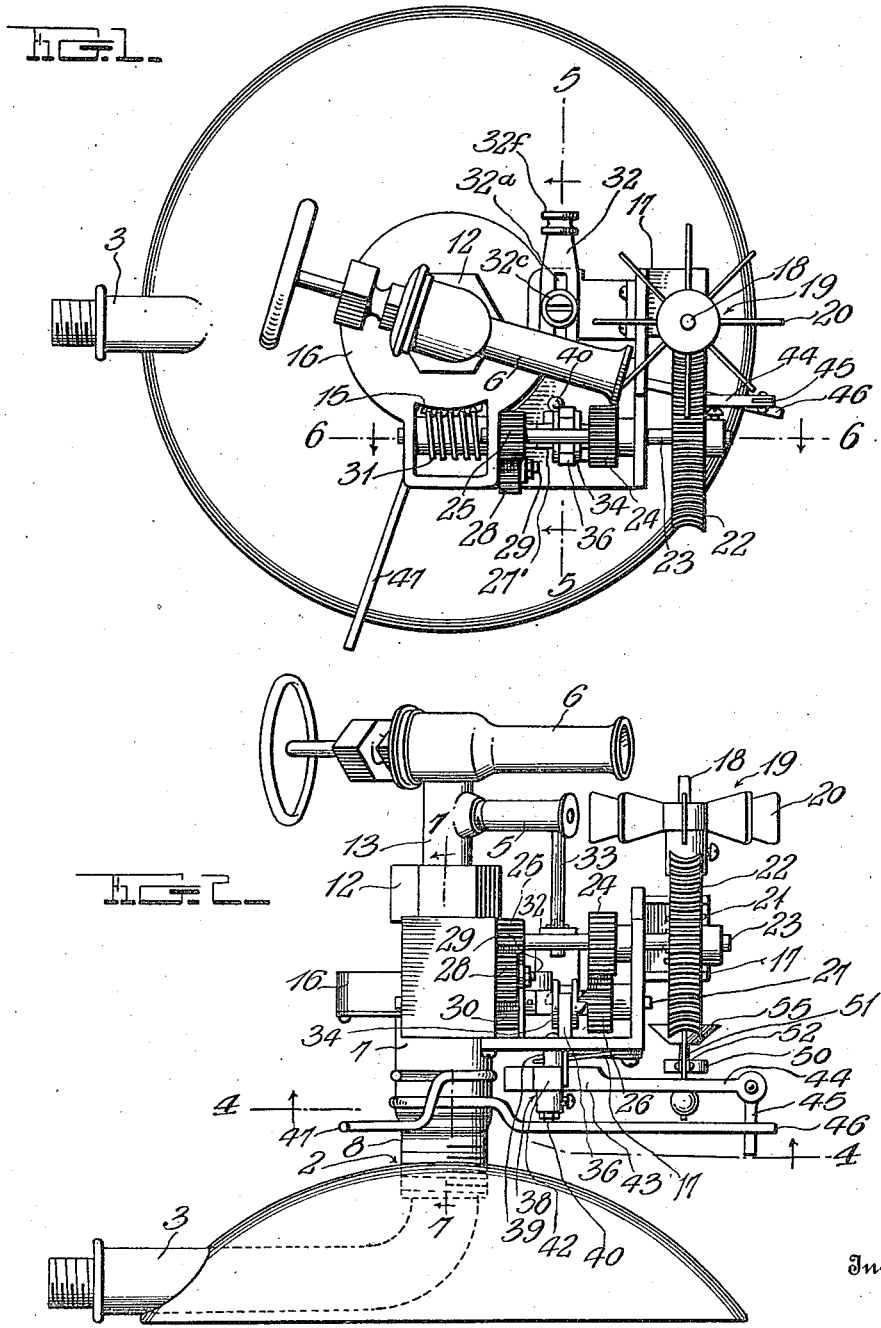

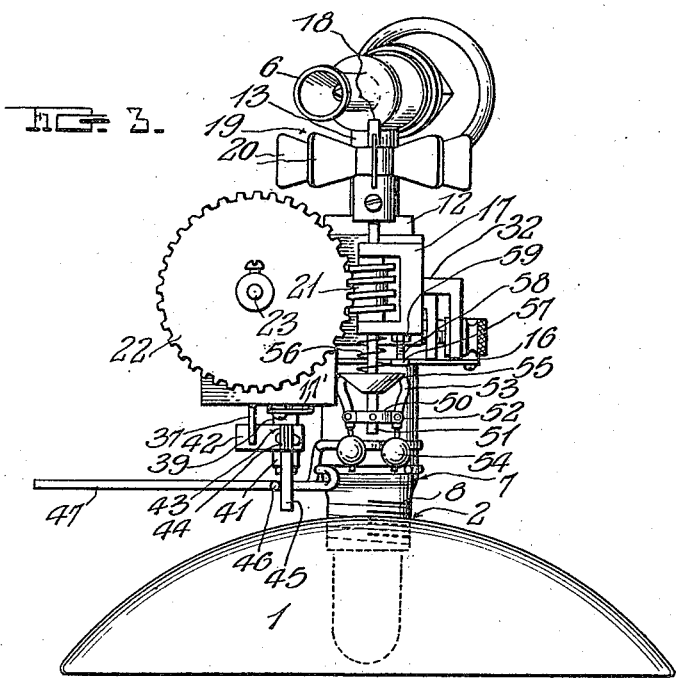
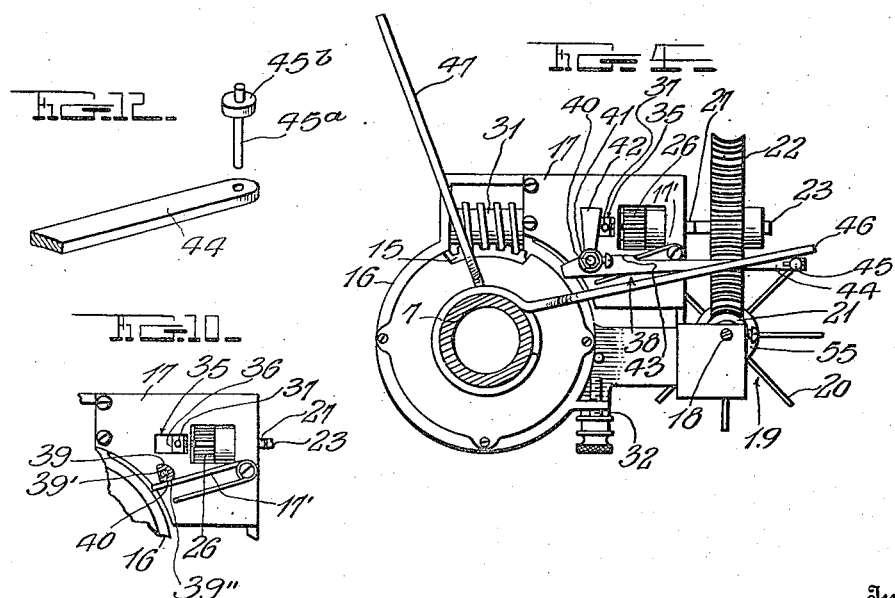

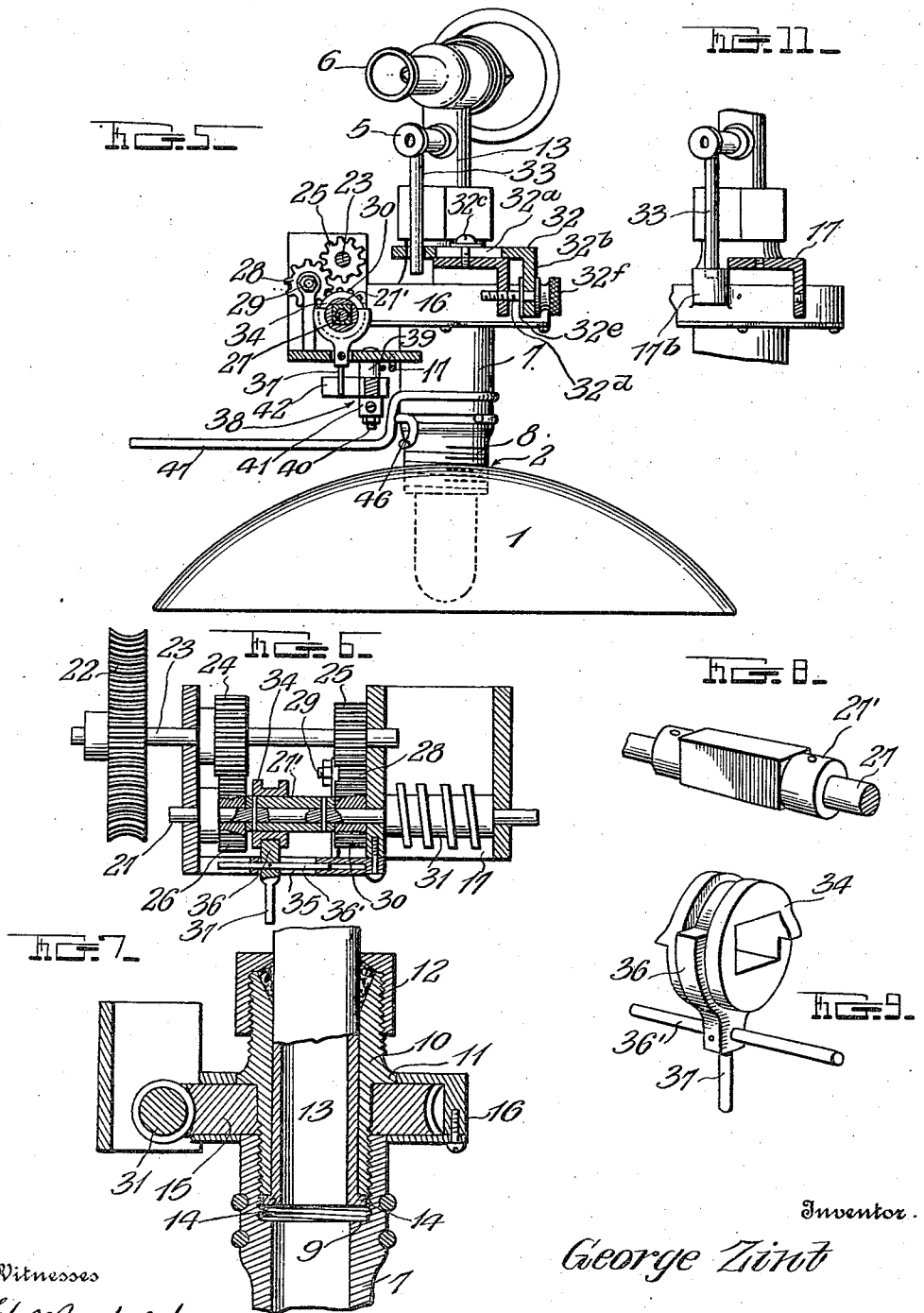

UNITED STATES PATENT OFFICE.

GEORGE ZINT, OF WAPAKONETA, OHIO.

AUTOMATIC SPRINKLER.

1,146,228. Specification of Letters Patent. Patented July 13, 1915.

Application filed August 13, 1914. Serial No. 856,601.

*To all whom it may concern:*

Be it known that I, GEORGE ZINT, a citizen of the United States, residing at Wapakoneta, in the county of Auglaize and State of Ohio, have invented certain new and useful Improvements in Automatic Sprinklers; and I do declare the following to be a full, clear, and exact description of the invention, such as will enable others skilled in the art to which it appertains to make and use the same.

This invention relates to improvements in that class of automatic sprinklers which will evenly distribute a volume of water over a prescribed area that is desired to be irrigated by sprinkling.

The object of the invention is to provide a sprinkler which is operated automatically by the impulse or force of the fluid medium carried thereby and which will evenly distribute the water over a large area and which will not clog up.

Another object is to provide a revoluble sprinkler equipped with means for causing it to reciprocate automatically and the stroke of which may be varied at will to water a larger or smaller area as may be desired.

With the above and other objects in view, the invention consists of certain novel features of construction, combination and arrangement of parts as will be more fully described and claimed.

In the accompanying drawings: Figure 1 represents a plan view of a sprinkler embodying one form of this invention; Fig. 2 represents a side elevation of this improved sprinkler; Fig. 3 is an end elevation thereof; Fig. 4 is a transverse section taken on the line 4—4 of Fig. 2; Fig. 5 is a vertical section taken on the line 5—5 of Fig. 1; Fig. 6 is a similar view taken in a plane at right angles to Fig. 5 and on the line 6—6 of Fig. 1; Fig. 7 is an enlarged vertical section taken on the line 7—7 of Fig. 2; Fig. 8 is a detail perspective view of the clutch shaft; Fig. 9 is a similar view of the clutch; Fig. 10 is a detail bottom plan view showing the spring for holding the clutch member off dead center. Fig. 11 is a detail transverse section showing another manner of mounting the nozzle or pet cock; Fig. 12 is a detail perspective view showing a slightly different manner of mounting the pin which controls the oscillatory movement of the sprinkler.

In the embodiment illustrated a supporting base 1 is shown which may be of any desired or suitable construction and is here illustrated in the form of a hollow concavo-convex member which is provided with an opening 2 in the top thereof in which the device to be described is designed to be mounted, and with which a coupling member 3 is connected said coupling being designed for engagement with a hose or other supply pipe.

In Figs. 1 to 5, a sprinkler is shown in which two nozzles 5 and 6 are employed, the smaller one 5 for supplying water under pressure to drive the actuating mechanism of the sprinkler and the larger one 6 for spraying the surrounding area to be irrigated. The smaller actuating nozzle 5 may be in the form of a pet cock or simply a drill hole of sufficient size to supply the necessary amount of water for driving the sprinkler actuating mechanism as will be hereinafter described. These nozzles 5 and 6 are revolubly mounted on a casting 7 having a fitting 8 for threaded engagement with the socket 2 of the supporting base 1. This casting 7 has a bore extending therethrough which is enlarged at its upper or outer end to provide a shoulder 9 and the enlarged portion thereof is internally threaded to receive an exteriorly threaded tubular coupling member 10. This member 10 has a smooth bore and is exteriorly threaded at its opposite ends, with a flange 11 projecting laterally therefrom intermediate of its ends and which forms a stop for a purpose to be described.

A packing nut 12 is mounted on the outer end of the member 10 to insure a water tight connection between the parts.

The casting carrying the hose nozzles 5 and 6 has a tubular stem 13 depending therefrom and extending at right angles to the nozzles and is adapted to extend through the coupling member 10 and to revolve therein. This stem 13 which has an annular stop 14 on its free end, after being passed through the coupling member 10 is connected with the casting carrying the nozzles 5 and 6, being secured thereto in any suitable or desired manner, the stop 14 serving to hold the stem in engagement with the coupling member 10 and to prevent their separation.

A large worm gear 15 is mounted between the members 7 and 10 resting on the outer edge of the casting 7 and secured thereto by the flange 11 on the member 10 between which and the outer end of said casting 7 said worm gear is held against turning. This worm gear 15 is mounted in an annular casing 16, the lower wall of which is preferably detachably connected to permit the parts to be separated and removed when desired. A bracket 17 extends laterally from this casing 16 and has supported thereon an upright shaft 18 carrying a driving wheel 19 having a plurality of radially extending blades 20 positioned in the path of the nozzle 5 and against which the water discharged through said nozzle is adapted to impinge for rotating said wheel and actuating the sprinkler in a manner now to be described. A worm 21 is carried by this shaft 18 and meshes with a worm gear 22 carried by a shaft 23 mounted in a bracket supported by the casing 16, said shaft 23 extending in a plane at right angles to the shaft 18. This shaft 23 is provided with spur gears 24 and 25 spaced apart thereon, the gear 24 being adapted to mesh with a coöperating gear 26 on a parallel shaft 27 also supported by the bracket carrying the shaft 23 and which is here shown mounted in a plane below said shaft 23. The gear 25 meshes with an idler gear 28 mounted on a stub shaft 29 projecting laterally from said bracket. This idler gear meshes with a gear 30 loosely mounted on the shaft 27 and through which motion may be imparted to said shaft 27. This shaft 27 also carries a worm 31 positioned to mesh with the larger worm gear 15, a portion of the casing 16 being cut away to provide for the meshing of this worm with said gear and by means of which the gear 15 rotates the casing 16 and all of the parts carried thereby are revolved.

An apertured plate 32 is mounted on the bracket 17 and the aperture thereof is positioned to receive a stem 33 which depends from the casting carrying the nozzles 5 and 6 whereby said nozzles are connected with the casing 16 and adapted to revolve therewith. This plate 32 is preferably adjustably mounted on the bracket to vary the position of the nozzle 5 in respect to the blades of the driving wheel so that a greater or less quantity of water may be discharged onto said blades as desired, thereby regulating the speed of said wheel and consequently the turning of the sprinkler. As shown this plate 32 is longitudinally slotted as shown at 32ª and has a depending apertured arm 32ᵇ at its outer end. A screw 32ᶜ extends through the slot 32ª into bracket 17 for adjusting said plate to vary the position of the nozzle 5 relatively to the blades of wheel 19.

A depending apertured ear 17ª depends from bracket 17 and the aperture therein is threaded and registers with the aperture in arm 32ᵇ and said apertures are designed to receive a plate adjusting screw, or bolt 32ᵈ, the threaded portion of which engages the threaded aperture in said ear 17ª. (See Fig. 5). A collar or flange 32ᵉ, is fixed to the bolt 32ᵈ about midway the ends thereof and between which and the flanged head 32ᶠ of said bolt is mounted the arm 32ᵇ, the bolt extending through the aperture in said arm and on the turning of the bolt said arm is moved toward or away from the bracket arm 17ª and hence adjusts the plate 32 and the nozzle 5 connected therewith. When a pet cock is used this plate may be dispensed with and the stem 33 mounted in a boss 17ᵇ carried by bracket 17 (see Fig. 11).

A clutch member 34 is mounted to slide on a sleeve 27′ fixed to the shaft 27 and is adapted to be moved thereon for engagement with either of the gears 26 or 30 carried by said shaft and which are provided on their inner faces with clutch members for coöperation with the clutch member 34 when shifted into engagement therewith. The outer face of this sleeve is preferably made angular as shown in Fig. 8 and the bore of the member 34 is shaped to correspond therewith (see Fig. 9). The bracket in which this shaft 27 is mounted has a horizontal plate which extends under said shaft and is longitudinally slotted as shown at 35. Engaged with the clutch element 34 is a bifurcated member 36 which has a depending shank 37 extending through the slot 35 into the path of a horizontally movable clutch shifting member 38 now to be described. This clutch shifting member 38 is here shown in the form of a sleeve 39 rotatably mounted on a depending stud 40 and which is held in operative position on said stud by a collar 41 here shown held in operative position by a set screw. Extending radially from the sleeve 39 are two arms 42 and 43 spaced a suitable distance apart to alternately engage the shank 37 of the clutch member for shifting the clutch 34 in opposite directions to bring it into engagement with the gear 26 or 30 as may be desired. The shifting of this clutch into engagement with one or the other of these gears reverses the direction of movement of the large worm gear 15 thereby reversing the direction of movement of the sprinkler. The arm 43 has an extension 44 in the free end of which is pivotally mounted an actuating handle 45 adapted when in raised position, to extend in alinement with said arm 43 and when turned downwardly in a plane at right angles to said arm, to engage adjustable stops 46 and 47 carried by the casting 7 on the turning of the sprinkler, thereby rotating the sleeve 39 and shifting the clutch for reversing the direction of the sprinkler. For instance, when the sprinkler turns in one direction, a sufficient distance to bring the handle 45 into engagement with the stop 46, the continued movement of said sprinkler will cause the handle and the arm by which it is carried to turn inwardly and thus bring said arm into engagement with the depending shank 37 of the clutch 36 and shift the clutch longitudinally on the shaft 27 to disengage it from the gear 30 and move it into engagement with the gear 26 thereby reversing the movement of the shaft 27 and consequently of the casing 16 and the parts carried thereby. The casing 16 will then continue to revolve in the opposite direction carrying with it the parts connected therewith until said handle 45 contacts with the other stop 47 when the clutch will be again shifted to throw it into engagement with the gear 30 and thus reverse the direction of movement of the sprinkler.

The sleeve 39 has two flat faces 39' and 39" here shown disposed at right angles to each other and which are designed to be engaged alternately by a spring 17' to hold the clutch always off the dead center (see Figs. 4, 5 and 10). Any suitable spring may be employed for continuously exerting pressure on one or the other of the faces 39' or 39".

From the above description, it will be obvious that the flowing of the water through the nozzle 5 will thus cause the sprinkler to reciprocate horizontally back and forth and thus spray the water through nozzle 6 over a semi-circular area, the reciprocatory stroke of the sprinkler may be varied by changing the positions of the stops 46 and 47 on the casting 7 which may be accomplished by simply moving said stops in the desired direction, whereby the stroke of the sprinkler may be made larger or smaller as desired. These stops are shown frictionally engaged with the casting 7 but they may be mounted thereon in any other suitable manner.

If desired, the sprinkler may be rotated in circular courses and when this is desired, the handle 45 of the clutch operating lever is turned outward in alinement with the arm 43 and is thus positioned out of the path of the stops 46 and 47 and consequently the clutch will not be operated and the sprinkler will revolve in a circular path.

In order to control the speed of the sprinkler, a suitable governor is provided which is here shown in the form of a centrifugal governor and comprises a collar 50 fixedly mounted on an extension 51 of the shaft 18 which carries the driving wheel of the sprinkler. The governor is provided with pairs of radially projecting bearing lugs 52 between each pair of which is pivotally mounted a weight supporting arm 53 having on one end a weight 54 and having rounded inner corners which are adapted to be engaged with the conical or tapered inner face of a brake disk 55 which is slidably and loosely mounted on the shaft extension 51. The disk 55 is normally held in yielding engagement with the arms 53 by a coil spring 56 arranged on the shaft extension 51 between said disk and the lower face of the bracket which supports said shaft.

The disk 55 is adapted to be forced laterally by the engaging ends of the arms 53 and into engagement with a brake shoe 57 which is secured to the inner end of an adjusting screw 58 arranged in the adjacent side of the supporting bracket and secured to hold the shoe 57 in its adjusted position by means of a jam nut 59.

The movement of the driving wheel is imparted to the extension 51 which constitutes the governor shaft and said shaft will, when revolved by said driving wheel, impart a centrifugal action to the weighted arms 53, thus causing the inner ends thereof to move the brake disk 55 into more or less forcible engagement with the brake shoe, thereby retarding the movement of the governor shaft and consequently of the power transmitting shaft of which it forms an extension so that by regulating the position of the brake shoe, the speed of the sprinkler may be controlled.

I claim as my invention:

1. In an automatic sprinkler, a nozzle, revoluble fluid actuated means for revolving said nozzle, said fluid actuated means being disposed in the path of the fluid discharged from said nozzle, the said nozzle revolving means including a train of gears actuated by said fluid actuating means, a clutch for reversing said gears to change the direction of movement of said nozzle, and means for automatically operating said clutch at predetermined intervals.

2. In an automatic sprinkler, a nozzle, revoluble fluid actuated means for revolving said nozzle, said fluid actuated means being disposed in the path of the fluid discharged from said nozzle, said nozzle revolving means including a train of gears actuated by said fluid actuating means, a clutch for reversing said gears to change the direction of movement of said nozzle, said clutch having a depending stem, a laterally movable element positioned to engage said stem for shifting said clutch, and means disposed in the path of said element for interrupting its movement at predetermined intervals and thereby shifting said clutch to reverse the direction of movement of the nozzle.

3. In an automatic sprinkler, a nozzle, revoluble fluid actuated means for revolving said nozzle, said fluid actuated means being disposed in the path of the fluid discharged from said nozzle, said nozzle revolving means including a train of gears actuated by said fluid actuating means for operating said nozzle revolving means, a clutch for reversing said gears to change the direction of movement of said nozzle, and adjustable arms disposed in the path of said element for interrupting its movement at predetermined intervals and thereby shifting said clutch to reverse the direction of movement of the nozzle.

4. In an automatic sprinkler, a coupling for connection with a fluid supply, a nozzle revolubly carried by said coupling, a worm gear fixedly mounted on said coupling, a casing encircling said gear, a driving wheel carried by said casing and having blades positioned in the path of said nozzle, a worm on the shaft of said driving wheel, a worm gear meshing with said worm, a train of gears actuated by said worm gear, a clutch for changing the direction of movement of said train of gears, and means for actuating said clutch at predetermined intervals.

5. In an automatic sprinkler, a coupling for connection with a fluid supply, a nozzle revolubly carried by said coupling, a worm gear fixedly mounted on said coupling, a casing encircling said gear, a driving wheel carried by said casing and having blades positioned in the path of said nozzle, a worm on the shaft of said driving wheel, a worm gear meshing with said worm, a train of gears actuated by said worm gear, a clutch for changing the direction of movement of said train of gears, means for actuating said clutch at predetermined intervals, said means comprising a laterally movable spring pressed member, a stem carried by said clutch projecting into the path of said laterally movable member, and means for actuating said member at predetermined intervals whereby the clutch is shifted alternately in opposite directions.

In testimony whereof I have hereunto set my hand in presence of two subscribing witnesses.

GEORGE ZINT.

Witnesses:
C. A. STUEVE,
SARAH WATERS.